United States Patent
Kaule

(10) Patent No.: US 7,777,953 B2
(45) Date of Patent: Aug. 17, 2010

(54) METHOD FOR PRODUCING A GRATING IMAGE, GRATING IMAGE AND SECURITY DOCUMENT

(75) Inventor: Wittich Kaule, Emmering (DE)

(73) Assignee: Giesecke & Devrient GmbH, Munich (DE)

( * ) Notice: Subject to any disclaimer, the term of this patent is extended or adjusted under 35 U.S.C. 154(b) by 1398 days.

(21) Appl. No.: 10/517,491

(22) PCT Filed: Jun. 10, 2003

(86) PCT No.: PCT/EP03/06081

§ 371 (c)(1),
(2), (4) Date: Aug. 17, 2005

(87) PCT Pub. No.: WO03/106189

PCT Pub. Date: Dec. 24, 2003

(65) Prior Publication Data

US 2006/0152807 A1   Jul. 13, 2006

(30) Foreign Application Priority Data

Jun. 12, 2002   (DE) ................................ 102 26 115

(51) Int. Cl.
*G02B 5/18* (2006.01)
(52) U.S. Cl. ...................................... 359/566; 359/900
(58) Field of Classification Search .................. None
See application file for complete search history.

(56) References Cited

U.S. PATENT DOCUMENTS

| 4,576,439 | A | | 3/1986 | Gale et al. |
| 5,032,003 | A | * | 7/1991 | Antes .......................... 359/567 |
| 5,335,113 | A | * | 8/1994 | Jackson et al. .............. 359/569 |
| 5,784,200 | A | * | 7/1998 | Modegi ....................... 359/567 |
| 5,825,547 | A | | 10/1998 | Lee |
| 6,088,161 | A | | 7/2000 | Lee |
| 6,369,919 | B1 | | 4/2002 | Drinkwater |
| 2003/0160192 | A1 | * | 8/2003 | Inanami et al. ........ 250/492.23 |

FOREIGN PATENT DOCUMENTS

| DE | 42 43 905 A1 | 6/1994 |
| EP | 0 766 103 A1 | 4/1997 |
| GB | 2 136 352 A | 9/1984 |
| WO | WO 94/14621 A1 | 7/1994 |

OTHER PUBLICATIONS

Rai-Choudhury, P., "SPIE handbook of microlithography, micromachining and microfabrication", *Handbook of Microlithography*, Section 2.5 Systems, 16 pages, 1997.

* cited by examiner

*Primary Examiner*—Arnel C Lavarias
(74) *Attorney, Agent, or Firm*—Rothwell, Figg, Ernst & Manbeck, P.C.

(57) ABSTRACT

To produce a grating image for a security document, a contour line (9) is filled with hatching lines (11) with the help of a drawing program, grating coordinates are calculated from the intersection points between the hatching lines (11) and the contour line (9), and the such produced data records of the grating image are supplied to a lithography machine.

4 Claims, 8 Drawing Sheets

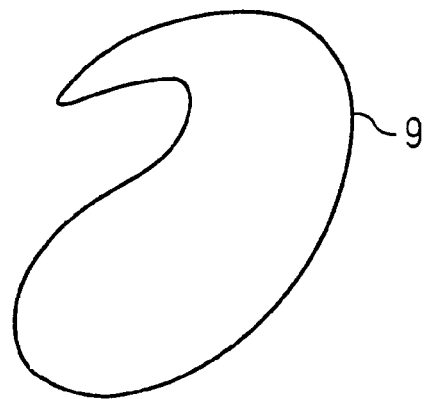
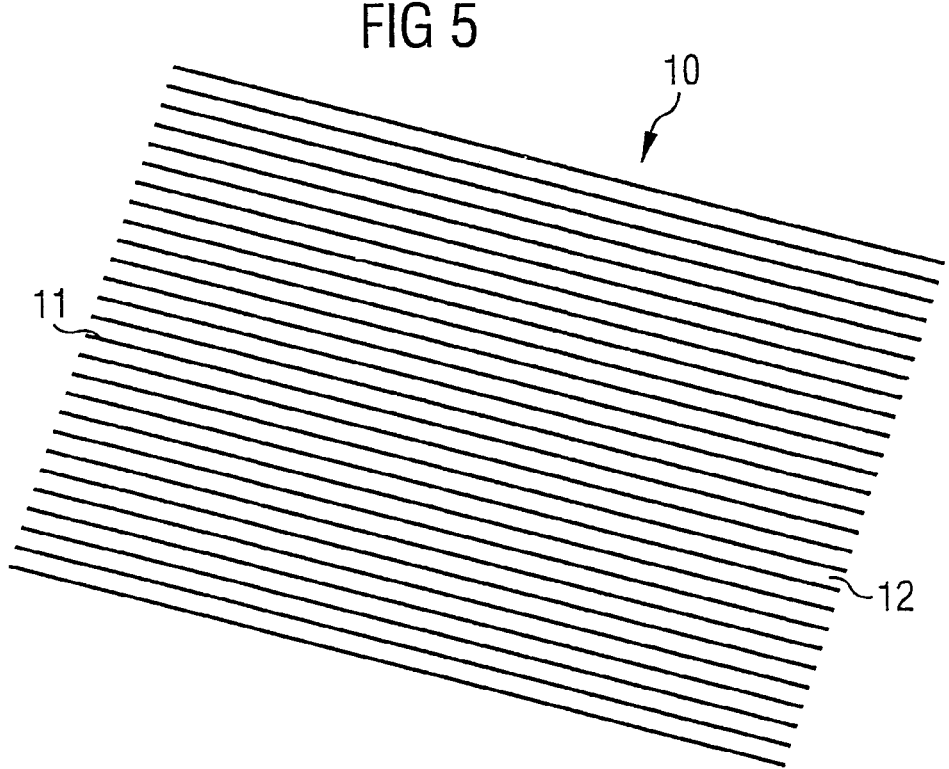

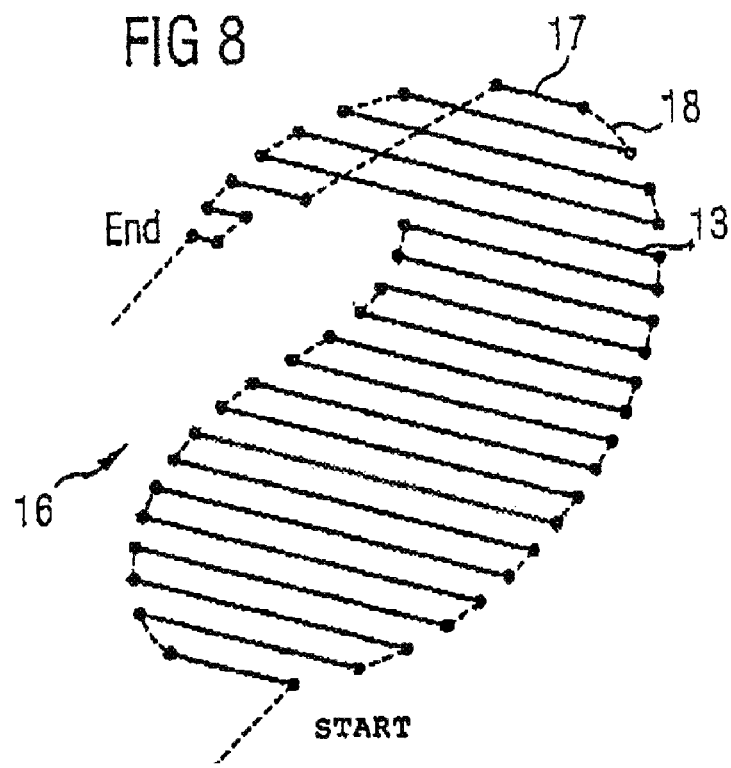
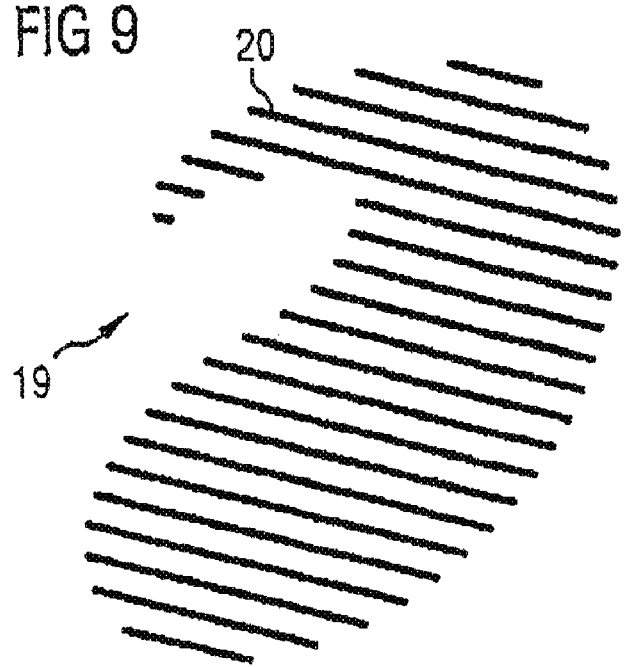

METHOD FOR PRODUCING A GRATING IMAGE, GRATING IMAGE AND SECURITY DOCUMENT

CROSS-REFERENCE TO RELATED APPLICATION

This application is a National Phase of International Application Serial No. PCT/EP03/06081, filed Jun. 10, 2003.

FIELD OF THE INVENTION

The invention relates to a method for producing a grating image having a grating pattern, the grating pattern being formed on the surface of a substrate with the aid of a writing apparatus.

DESCRIPTION OF THE BACKGROUND ART

The invention further relates to a grating image and a security document, such as bank notes, ID cards, or the like, with such a grating image.

Holograms, holographic grating images and further optically variable diffraction structures are used as security elements against forgeries in credit cards, bank notes, product packaging and the like. In general the manufacturing of these diffraction structures begins with exposing a light-sensitive layer to overlapping, coherent light beams.

Real holograms are formed by illuminating an object with coherent laser light, the laser light disturbed by the object being overlapped with an undisturbed reference beam in the light-sensitive layer.

Holographic diffraction gratings are the result, when the light beams overlapping in the light-sensitive layer consist of spatially expanded, uniform, coherent wave fields. When these are allowed to act upon the light-sensitive layer, e.g. a photographic film or a photoresist layer, the result is a holographic diffraction grating, which e.g. in a photographic film is preserved as bright and dark lines or in a photoresist layer as peaks and valleys. Because the light beams in this case are not disturbed by an object, the only result is an optically variable colour effect, but not the display of an image.

Holographic grating images can be produced out of holographic diffraction gratings, when not the entire surface of the light-sensitive material is covered with a uniform holographic diffraction grating, but masks are used, so that only parts of the recording area are covered with a uniform grating pattern, while other parts of the recording area may be covered with other grating patterns with the help of other masks. A holographic grating image thus is composed of several grating fields with different diffraction grating patterns. With a grating image formed out of the sum of the grating fields most different image motifs can be depicted.

The diffraction gratings of a holographic grating image, usually, are ruled gratings with a multitude of grating lines located side by side. All diffraction gratings of each grating field or image field of the grating image are characterized by the grating constant, the azimuth angle and the contour or the outline. The grating constant here corresponds to the distance between the grating lines and the azimuth angle describes the inclination of the grating lines with respect to a reference direction. The grating constant and the azimuth angle are determined by the wavelength and the incidence direction of the wave fields used for exposing. The outlines of the image fields are produced with the aid of masks.

The grating constants of the grating patterns in the individual image fields are essential for the colours in the grating image, while the azimuth angles of the grating patterns are responsible for the visibility of these image fields from certain viewing angles. On the basis of this technique thus optically variable images, e.g. moving images or also plastically appearing images can be produced.

In general terms there can be stated, that a real hologram is an overlapping of holographic diffraction gratings, whereas in a holographic grating image several holographic diffraction gratings are disposed side by side. In general, real holograms appear photographically true-to-life compared to grating images. Grating images, however, can be designed graphically. In addition, grating images are more light intensive than real holograms, since the undisturbed diffraction gratings located side by side shine more intensive than the overlapping disturbed diffraction gratings.

The diffraction gratings located side by side can be holographically produced in different ways. One possibility is to divide the grating image into large-surface image fields and develop covering masks for these, which permit only one image field to be exposed at a time to form a uniform holographic diffraction grating. Or the entire grating image is divided into a multitude of small, nearly dot-shaped areas, these dot areas having a diameter of 10 to 200 micrometer. In the dot areas then with the aid of a dot matrix machine holographic diffraction gratings can be formed.

In particular with finely structured grating fields with different grating data the mask method is cumbersome in handling. Since the masks have to be brought into very close contact with the light-sensitive layer during the exposure process and positioned very precisely, which requires manual skill and dexterity.

But the manufacturing of the grating images divided into dot areas causes problems as well. The grating images divided into dot areas in fact can be produced automatically by machine and without requiring manual skill, but then the intensity of the reflected light is reduced by the spacings between the dot areas. Furthermore, the colours of the reflected light are distorted, since the gratings are composed in a small-surface fashion and are not uniform over a large surface. Further disadvantages are the perceptibility of the divided dots when viewed under a magnifying glass as well as the low degree of security, because dot matrix machines are easily available.

Furthermore, it is known to produce the dot areas of a quasi-screened grating image by means of an electron beam. The aforementioned disadvantages in connection with the grating image being divided into dots, however, apply in the same way also to this manufacturing variant.

SUMMARY OF THE INVENTION

Starting out from this prior art it is the problem of the invention to provide a method for producing grating images, which leads to optically variable grating images of a high light intensity, for the manufacturer of grating images is reliably realizable, and complicates the access for imitators by not dividing the grating images into dot areas.

Furthermore, it is the problem of the invention to create an optically variable grating image, which is easy to produce, and a security document with such a grating image.

This problem is solved by a method, a grating image, and a security element having the features disclosed herein. Also specified are advantageous embodiments and developments of the invention.

The invention enables large surfaces, visible to the naked eye, to be covered with a uniform grating, namely in a simple, non-holographic fashion, for example, by means of a focussed radiation, in particular an electron beam. That is, a motif to be depicted is divided into individual image fields, which have an extent visually perceptible and these image fields are covered with a uniform grating. In this way the light intensity of the grating image can be increased, since unexposed spacings do not exist. The distortion of colours is also prevented, because the fields are covered over a large area with a grating and are not composed of small-surfaced dots with interfering spacings.

With this method at first the contour lines of the grating fields the grating image consists of are determined, and then the contour lines or the grating fields are filled with the desired grating pattern. In the simplest case a grating image consists of one single grating field, which has a contour line corresponding to that of the motif to be depicted. The components of the grating pattern within the contour line then are described by grating coordinates, which are supplied to a writing apparatus. The writing apparatus is an apparatus, which preferably by means of a suitable radiation, in particular a bundled beam, on the basis of the grating coordinates causes a change of state in a radiation-sensitive substrate material, so as to produce the grating fields of a grating image in the substrate.

The method according to the invention is particularly suitable for the automatic machine production of large-surface grating fields, since contour lines for the grating fields can be prepared and filled with grating patterns with the aid of computer programs. Computer programs are also able to output grating coordinates suitable for describing the grating patterns to an apparatus for processing the radiation-sensitive material. Once a process according to the invention is set up, the manufacturer is in a position to repeatedly perform the method in a reliable fashion. The access for imitators, however, is made more difficult, since the apparatuses implementing the inventive method are not available on the market in this combination by standard and are very expensive.

It is to be further emphasized, that with this inventive method light-intensive grating images can be produced, because the method permits the production of grating fields of nearly any size.

In one preferred embodiment the grating pattern is a ruled grating, the intersection points the grating lines have with the contour line respectively defining starting point and end point of the respective grating line, the coordinates of which are supplied to the writing apparatus for processing the light-sensitive material.

The inventive proceeding permits a structured storing of the produced grating coordinates, which, if required, can be transferred to the writing apparatus.

The grating coordinates, furthermore, preferably are disposed in such a way in the file, that the coordinates of the starting point of a grating line are located side by side with the coordinates of the starting point of a neighboring grating line and the coordinates of an end point of a grating line are located side by side with the coordinates of the end point of a neighboring grating line. Such a disposition of the grating coordinates is of advantage, because when working through the grating coordinates sorted in such a way the beam follows a meandering line without having to cover long idle distances.

Furthermore it is of advantage, when the starting points and end points of neighboring grating lines each are connected by reversing distances, so that the beam does not have to cover idle distances between the grating lines either. In this case the beam does not need to be turned off between the grating lines.

For further increasing the writing speed of the beam, the reversing distances can also be formed in a rounded fashion.

The invention, however, is not restricted to the use of ruled gratings as grating pattern. Instead of straight grating lines also curved, wave-shaped or any other not straight grating patterns can be used. In this case it is not sufficient to store only the coordinates of the intersection points, the grating lines forming the grating pattern have with the contour line, as starting points and end points. Furthermore, information about the path of the grating lines within the contour line has to be provided. For that purpose the coordinates of any number of intermediate points can be used, which as a polygonal curve describe the form of the grating line. Alternatively, the form of the grating line can also be described as a Bezier curve, in which the coordinates of merely a few intermediate points and additionally a tangential direction with respect to the further path of the curve are stored.

The electron beam being used as a lithography instrument permits very fine resolutions, even as fine as in the nanometer range. For that reason it is inventively preferred. In those cases, in which grating patterns are to be written without requiring such a high resolution, also other lithography instruments are possible, so as to incorporate the inventive grating lines into a substrate. This can be, for example, mechanical engraving with a precision milling apparatus or a focussed UV laser. According to the invention all lithography instruments can be used which permit a drawing of strokes or lines according to the described data records, which from a starting point to an end point each is written in a sufficiently fine line thickness onto a suitable substrate.

The inventive grating images can be transferred to embossing dies of any desired form, which then are used for embossing any embossable layer, such as for example a thermoplastic layer or a lacquer layer, in particular a UV curable lacquer layer. This embossable layer preferably is located on a carrier, such as a plastic foil. Depending on the intended use of the plastic foil, the latter can have additional layers or security features. Thus the foil can be employed as security thread or security label. Alternatively, the foil can be designed as a transfer material, such as for example in the form of a hot stamping foil, which serves for the transfer of individual security elements to the objects to be secured.

The inventive grating images preferably are used for protecting documents of value, such as bank notes, ID cards, passports, and the like. Of course they can be also employed for other goods to be secured, such as CDs, books, etc.

According to the invention it is not necessarily required to compose the entire grating image out of inventive grating fields. In fact also only parts of a whole image can be realized in the form of the inventive grating fields, while other image parts are designed with the help of other methods, such as for example holographic gratings or real holograms or simple prints.

BRIEF DESCRIPTION OF THE DRAWINGS

In the following the invention is explained in detail with reference to the accompanying figures. It is pointed out, that the Figures are not a true-to-scale representation of the invention, but merely serve for illustrating.

FIG. 4 shows an outline of an inventive grating field;

FIG. 5 shows a grating pattern, with which the outline from FIG. 4 is to be filled;

FIG. 8 shows a processing path for the grating field from FIG. 7;

FIG. 9 shows a final grating image;

DETAILED DESCRIPTION OF THE INVENTION

Figure 1:
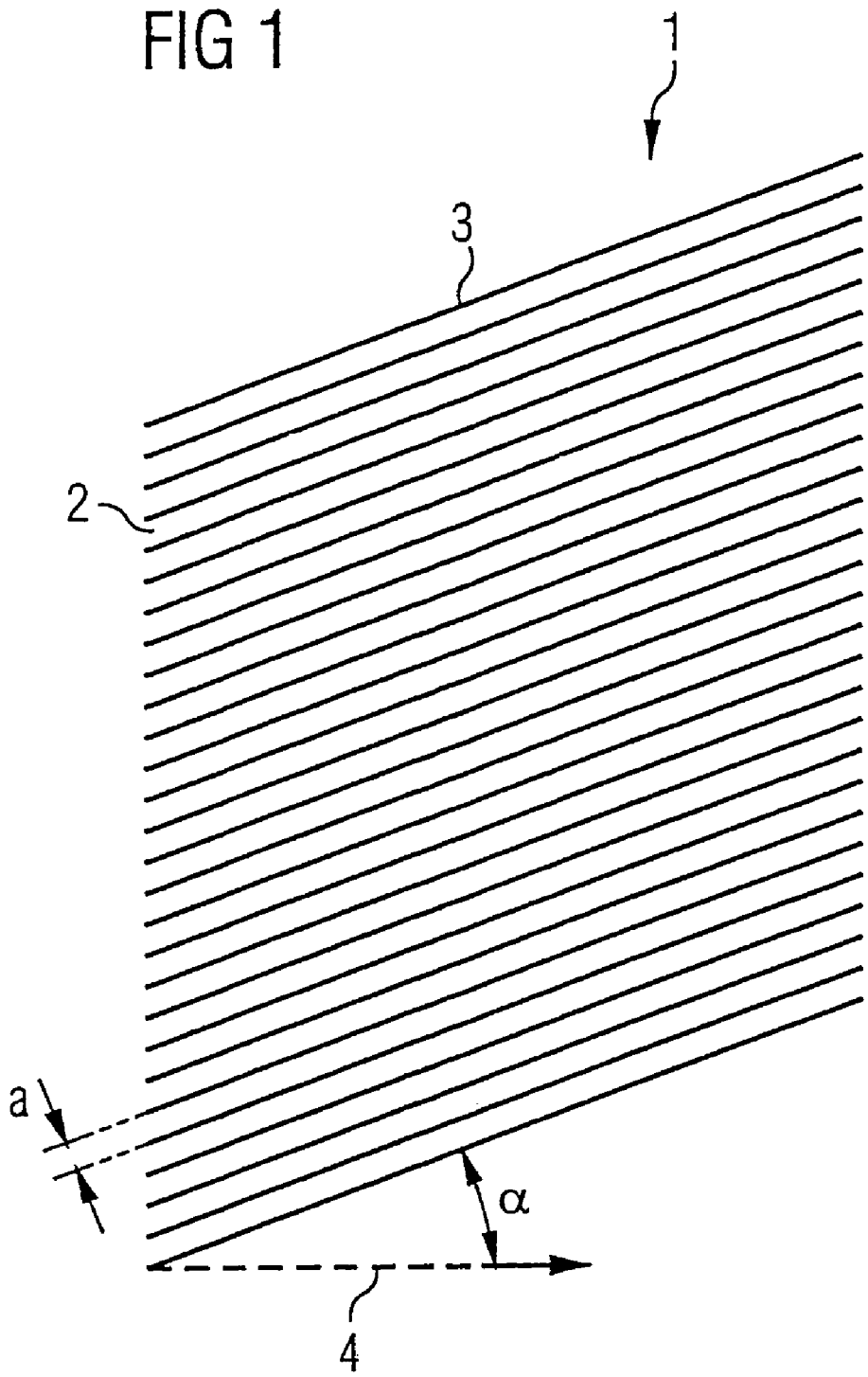
FIG. 1 shows a simple grating image with rhomboidal outline.

In FIG. 1 a grating image 1 is shown, which consists of a single rhomboidal grating field 2. The grating field 2 is filled with a grating pattern, which has a multitude of grating lines 3 disposed side by side, which are disposed in a distance a to each other. The distance a is also referred to as grating constant. In addition the grating lines 3 are positioned in an azimuth angle α to a reference direction 4. The grating constant is of essential importance for the colour of the grating field, while the azimuth angle α is responsible for the visibility of the grating field 2 in certain viewing angles.

Figure 2:
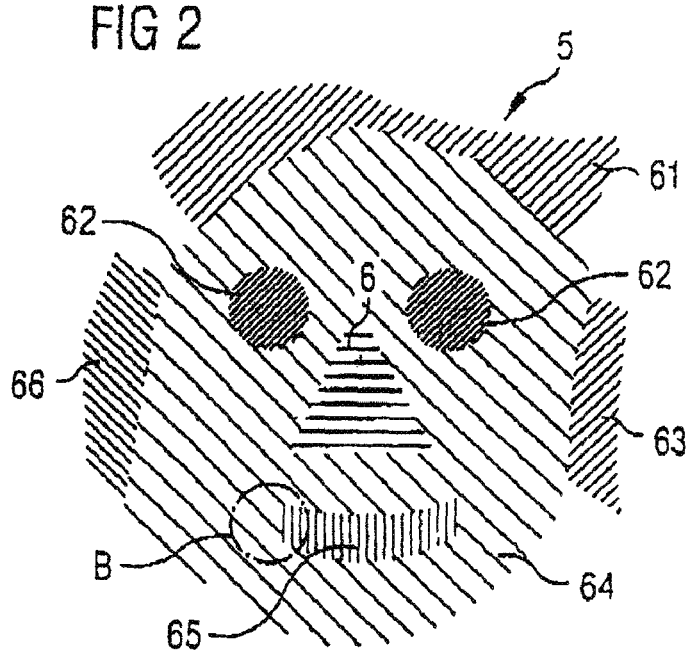
FIG. 2 shows a grating image composed of large-surface grating fields.

In FIG. 2 a further grating image 5 is shown, which is composed of a multitude of grating fields 6, 61, 62, 63, 64, 65, 66. Directly adjacent grating fields differ at least in one grating parameter from each other, such as e.g. the grating constant a or the azimuth angle α, which in the Figure is illustrated by the different hatchings. Not directly adjacent grating fields can perfectly well be covered with the same grating patterns. These grating fields when viewed from the same viewing angle are visually recognizable with the same colour. In the shown example this is the case for the grating fields 62, which depict the eyes of the face. For that reason they are covered with the same hatching.

Grating images, such as the grating image 5 shown in FIG. 2, according to prior art are produced with the aid of masks and a holographic exposure technique, namely by overlapping spatially expanded, uniformly coherent wave fields in a light-sensitive layer. Here only those grating fields are exposed, which have the same grating constant a and the same azimuth angle α.

Figure 3:
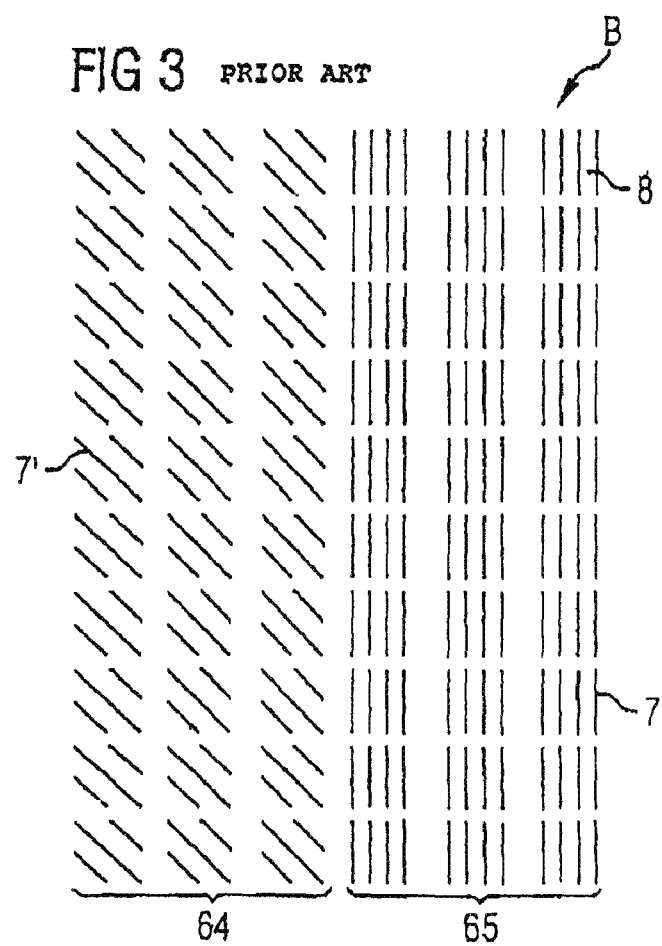
FIG. 3 shows a detail B from the grating image according to FIG. 2, which was manufactured with the help of the dot matrix method according to prior art.

If for producing the grating image 5 the known dot matrix method is used, each grating field 6, 61, 62, 63, 64, 65, 66 will be composed of a multitude of dot areas 8, as shown in FIG. 3. In FIG. 3 area B from FIG. 2 is shown in a highly magnified fashion, in case the grating image 5 was produced with the help of the dot matrix method. The border between two grating fields 64, 65 is shown, which are covered with different grating patterns 7, 7', so as to produce different visual impressions. Here, however, not the entire area of a grating field 64, 65 is provided with the respective grating pattern 7, 7', but merely the dot areas 8. The grating patterns 7, 7' disposed in the dot areas 8 are produced either with the help of a holographic method namely by the overlapping of coherent wave fields or they are written with electron beam. These dot areas 8 are separated from each other by non-diffracting intermediate areas. As already mentioned above these intermediate areas lead to a reduction of the light intensity, i.e. the grating field or the grating image appears less brilliantly. If the dot areas are placed directly next to each other, they will have to be disposed in an overlapping fashion due to the process tolerances. This overlapping as well leads to visible perturbing effects, such as distorted colours.

According to the invention each of the grating fields 6, 61, 62, 63, 64, 65, 66 of the grating image 5 uniformly within itself is covered with a continuous grating pattern, which is produced with the aid of a controllable light beam or particle beam, in particular an electron beam.

In the following the method for producing the inventive grating fields 6, 61, 62, 63, 64, 65, 66 is explained.

According to FIG. 4 in a first procedure step a contour line 9 is created, which corresponds to the contour line of the future grating field 6, 61, 62, 63, 64, 65, 66. For this purpose commercial drawing programs can be used, such as for example Adobe-Illustrator, Macromedia-Freehand, CorelDraw or the like. Contour lines 9 or grating fields 6, 61, 62, 63, 64, 65, 66, which are to be filled with different grating patterns, are created preferably separately, e.g. in different levels of the drawing program or in different files. So as to increase the clarity of the drawing indicated by the contour lines 9, areas located within the contour lines 9 can be differently coloured in the drawing program.

In a further procedure step in the drawing program a grating pattern 10 is produced, such as for example shown in FIG. 5. In FIG. 5 the grating pattern 10 is composed of a multitude of hatching lines 11, which correspond to the future grating lines. Since commonly used drawing programs do not work in the micrometer range or therebelow and the distance between the real grating lines typically lies within a range of between 0.5 and 2 micrometer, the grating pattern 10 is drawn in a highly magnified fashion. The magnification can be for example 10-fold, 100-fold or 1000-fold. The grating pattern 10 created in such a way when shown as computer image looks like a hatching, which extends across a drawing area 12.

But the grating pattern can also consist of wave-shaped or any other-shaped grating lines. In the drawing program these grating lines, as mentioned above, are described, for example, as polygonal curves or Bezier curves.

Figure 6:
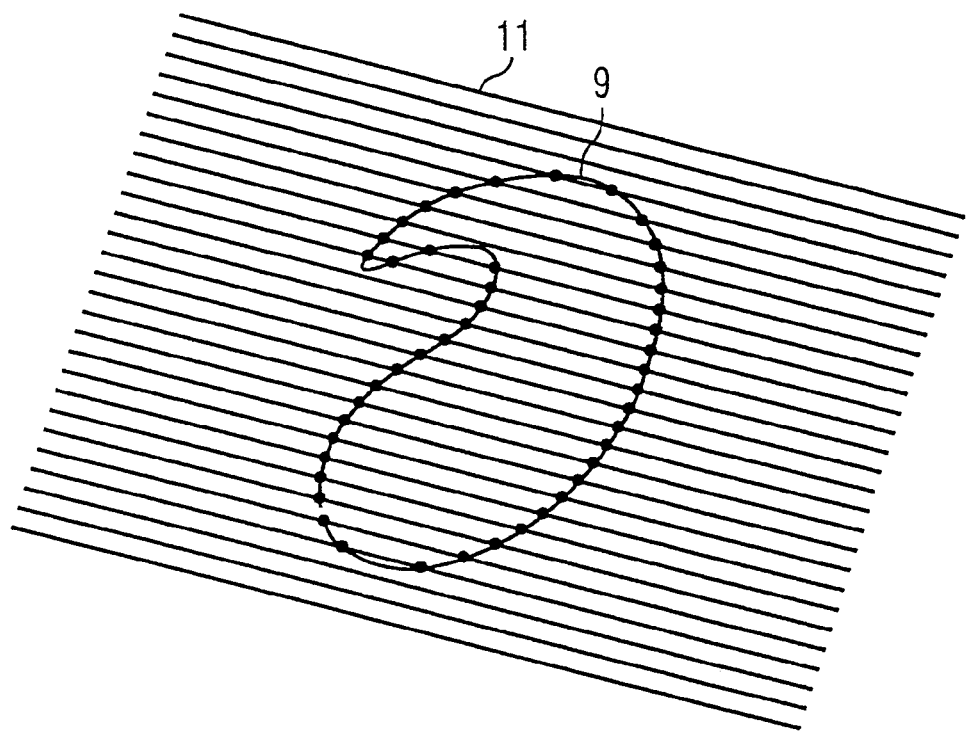
FIG. 6 shows an overlapping of the grating pattern from FIG. 5 with the contour line from FIG. 4.

Then according to FIG. 6 tools of the drawing program are applied, which permit a linking of the contour line 9, produced in the first procedure step and magnified with the same factor as the grating pattern, with the grating pattern 10 in such a way, that the grating pattern 10 is only preserved within the contour lines 9.

Figure 7:
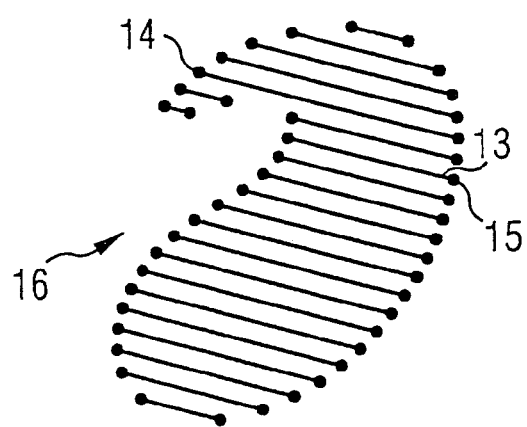
FIG. 7 shows a grating field, the grating lines of which are described by starting points and end points.

Thereby the grating lines 13 shown in FIG. 7 are formed, which each are defined by a starting point 14 and an end point 15, i.e. the intersection points the grating lines 13 have with the contour line 9, and together constitute a grating field 16. It has to be taken into account, that in so far as possible only the grating lines 13 are left over and all contour lines 9 are removed.

The data file of the drawing program then is converted into a conventional object-oriented format, in which segments of straight lines are described by their starting points and end points. Each grating line 13 then is described by a starting point 14 and an end point 15. A suitable object-oriented format is e.g. the EPS-(Encapsulated Postscript) format.

In the event that the grating lines are not straight, the method is the same. For a clear characterization of those sections of the grating pattern located within the contour line 9, however, the intersection points alone are not sufficient. The mathematical functions describing the grating lines have to be taken into consideration here.

If the drawing program does not contain any tools for linking the grating pattern 10 to the contour line 9, the following method can be applied:

In a self-written program, e.g. in Visual C++, the hatching lines 11 are produced with the desired spacing and in the desired angle of inclination. The contour line 9 is read from an EPS format data file into the self-written program as a polygonal curve. The intersection points the hatching lines 11 have with the contour line 9 are the starting points 14 and end points 15 of the grating lines 13, which are required for the following procedure steps.

The EPS format data file containing the object data of starting points 14 and end points 15 then has to be edited. In detail, the objects of the starting points 14 and end points 15 have to be brought to the right scale and disposed in a suitable order.

With a suitable search program the object data of the starting points 14 and end points 15 can be found in the EPS format data file. Here, in general, one will notice, that the object data are stored in a rather disordered fashion. Therefore, one writes a program, which for each starting point 14 or end point 15 of a grating line 13 finds the most proximate starting point 14 or end point 15 of a further grating line 13 and sorts the grating lines in this order. If in every second grating line 13 the starting point 14 and end point 15 are interchanged, then a meandering processing path 17 as shown in FIG. 8 will be the result. Since the grating lines 13 are connected to each other in a meandering fashion by the idle distances 18 drawn in dashed lines.

Furthermore, the object data of the starting points 14 and end points 15 are brought to the desired scale. If, for example, during the drawing process the values were magnified by a factor 1000, one interprets the millimeter values of the data record as micrometer values.

Data records are provided, which consist solely of starting points 14 and end points 15 of the grating lines 13. The grating lines 13 are to be written in an electron beam lithography machine, which works in a so-called CPC (Continuous Path Control) mode. This is a mode, in which the grating lines 13 characterized by starting points 14 and end points 15 can be written in a continuous fashion, in contrast to the so called "stitching" that is mostly used, in which all image components, i.e. the lines as well, are divided into small elements.

As a substrate, e.g. a quartz glass plate can be used, which is provided with a thin chromium layer and onto which a photoresist layer is applied. The photoresist layer is of a thickness as required by the desired depth of the image relief. Preferably the thickness of the photoresist layer amounts to some 100 nanometer. The substrate and the created data records are supplied to the electron beam lithography machine and the lithography process is started. Having worked through all data records of the grating image, the substrate is removed from the machine and the photoresist layer is developed. The final result is the desired grating image on the quartz glass plate in the form of a peak-and-valley profile.

The photoresist master then is further processed as usual in optical holography. At first a thin silver layer is applied to the photoresist layer by vapour deposition or chemical deposit. Then in a galvanic bath a nickel molding of the photoresist master is produced, multiplied and used as embossing die for embossing an embossed layer. A grating image 19 embossed in such a way is shown in FIG. 9. Therein the depressions 20 in the embossed layer are shown by way of dark lines. Depending on the production method the dark lines can also represent raised areas. The completely embossed layer in the end is transferred to the final substrate, e.g. a bank note, credit card, or packaging material. The embossed layer here either is located on the final substrate or forms this substrate. This can be the case, for example, with foils, which later are cut into ID cards, bank notes, or security elements, such as security threads or labels. Alternatively, the embossed layer can be disposed on an intermediate carrier, such as a transfer material. Preferably the transfer material is a hot stamping foil. In the simplest case it consists of a carrier foil, onto which a thermoplastic layer or a lacquer layer, preferably a UV curable lacquer layer is applied. The grating image is transferred into this lacquer layer or thermoplastic layer with the help of the inventive embossing die. Then the embossed layer is provided with a metallic or dielectric layer, which ensures, that the grating image can be viewed in reflected light. Then the layer structure is provided with an adhesive layer, which when transferred is brought into contact with the end substrate or an object to be secured. After the transfer the carrier foil preferably is stripped off.

All embodiments of the security element, security document, security paper or other objects to be secured can have further security features apart from the inventive grating image, such as machine-readable layers or other visually testable features.

Figure 10:
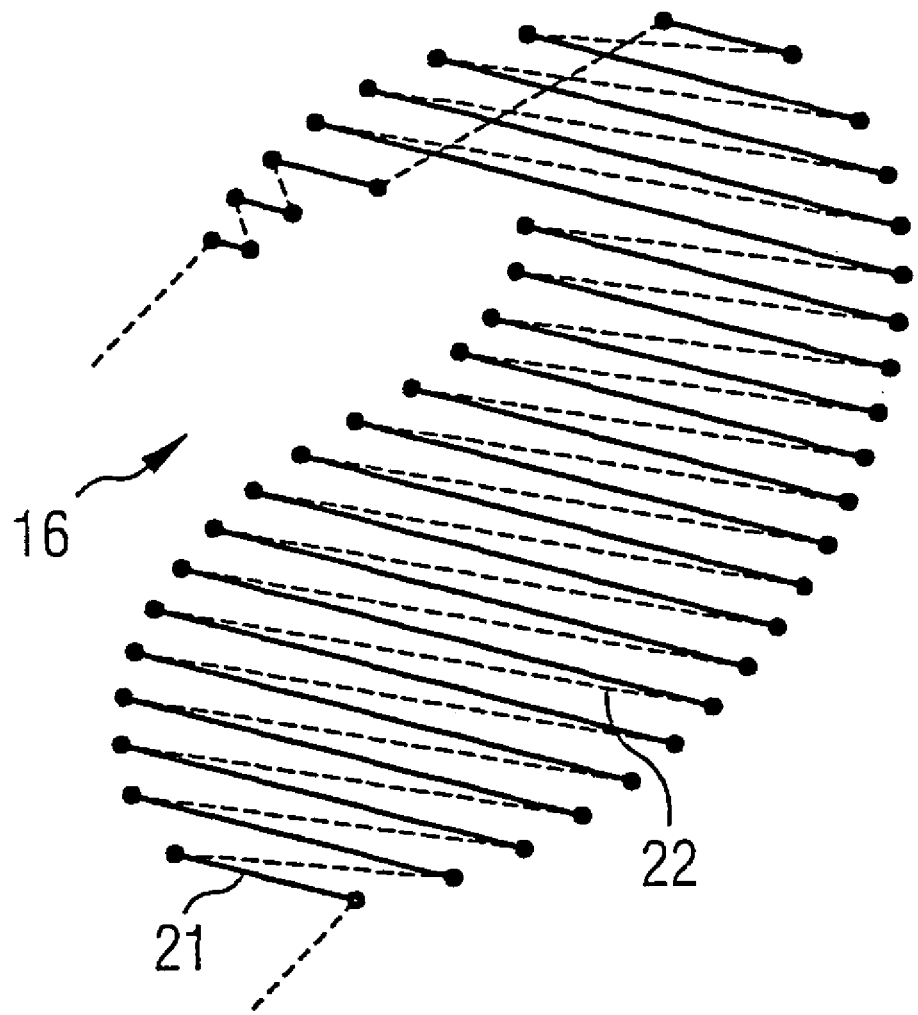
FIG. 10 shows a further modified processing path for the grating field from FIG. 7.

The meandering processing path 17 shown in FIG. 8 in general is preferred to a natural processing path 21 which runs in zigzag as shown in FIG. 10. In particular the idle distances, along which the electron beam is inactive, are optimally shortened with the meandering processing path 17. However, occasionally, the natural processing path shown in FIG. 10 can be of advantage as well, when, for example, the writing apparatus has to be turned off for cooling purposes between two writing operations. Since the natural processing path 21 in zigzag form includes long idle distances 22, the writing apparatus can be turned off while travelling along the idle distances 22.

Figure 11:
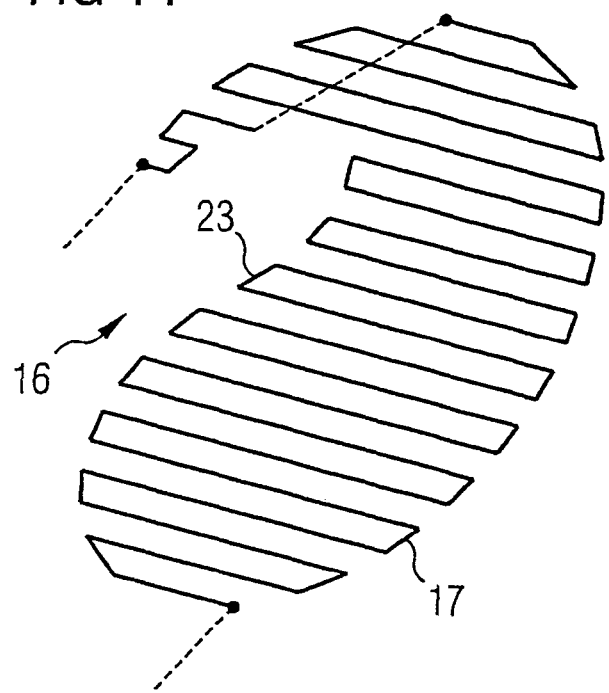
FIG. 11 shows the processing path from FIG. 8 without idle distances between neighboring grating lines.

A further advantage of the meandering processing path 17 is the fact that along the short idle distances 18 at the edge of the grating field 16 the electron beam does not have to be deactivated, because the short connecting sections 23 at the edge of the grating field 16 do not affect the optical function of the grating field 16. Therefore, with the electron beam also the processing path 17 as shown in FIG. 11 in the form of a to a large extent continuous polygonal curve can be written.

Figure 12:
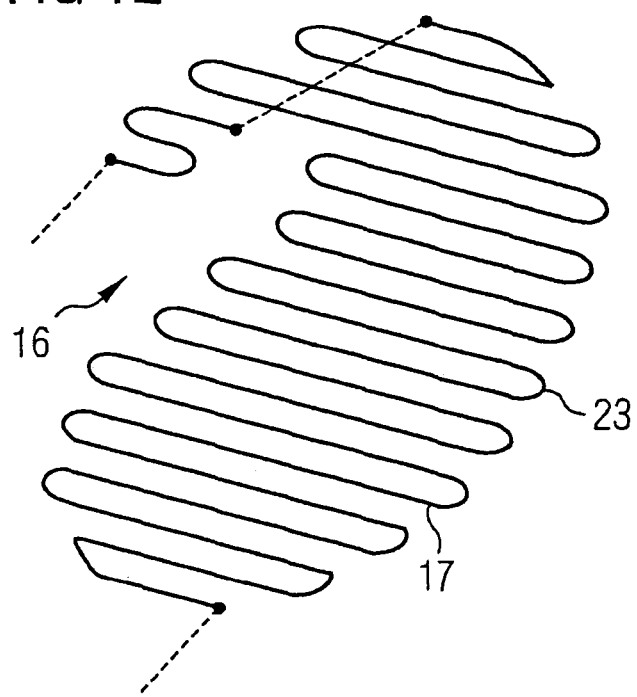
FIG. 12 shows another further modified processing path without idle distances between neighboring grating lines.

For further increasing the writing speed the corners of the connecting sections 23 can be looped or rounded. A processing path 17 respectively modified is shown in FIG. 12.

Figure 13:
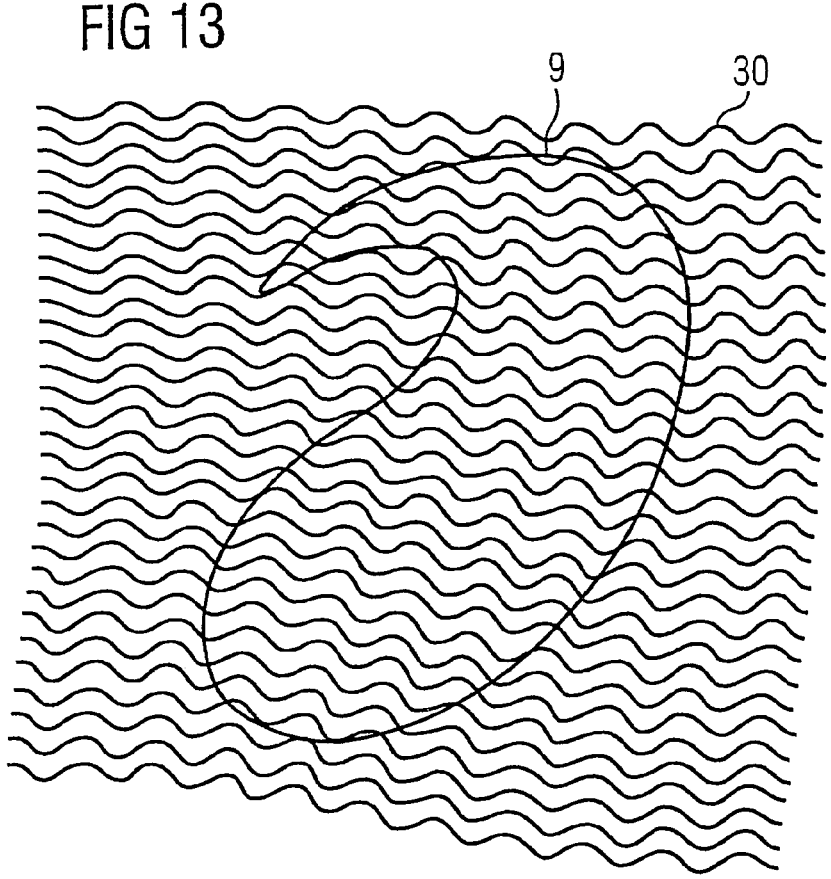
FIG. 13 shows the overlapping of a wavy-line-shaped grating pattern with the contour line from FIG. 4.
Figure 14:
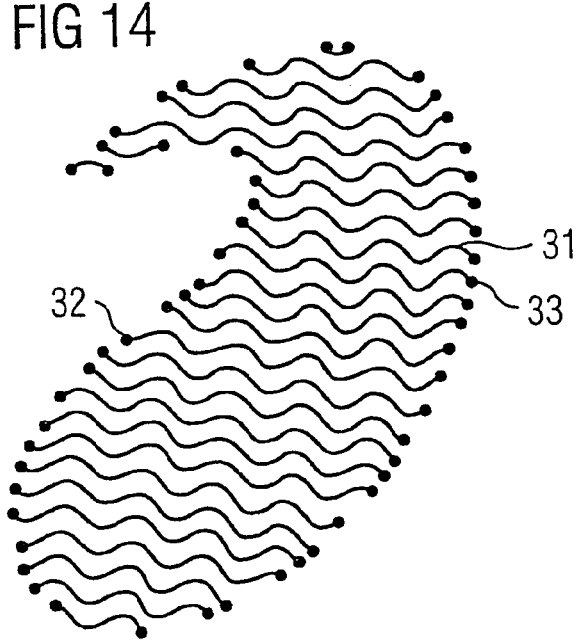
FIG. 14 shows a grating field, the grating lines of which are described by starting points and end points as well as intermediate points.

The FIGS. 13 and 14 are to be understood analogous with FIGS. 6 and 7, wherein the grating pattern 30 overlapped with the contour line 9 does not consist of straight lines 11, but of wave-shaped grating lines 31. The grating lines 31 of the grating pattern 30 moreover are disposed in such a way, that the spacing of the grating is increasing along a grating line 31 from the left to the right, as apparent in FIG. 13. The grating pattern 30 or the individual grating lines 31 here are described, as explained above, by polygonal curves or Bezier curves.

Analogous with the method explained in connection with FIGS. 6 and 7, here too, the intersection points 32, 33, the individual grating lines 31 have with the contour line 9, are determined. In contrast to the straight grating lines, these intersection points 32 and 33 are not sufficient as to completely describe the grating lines 31. The data record for this grating field, therefore, contains apart from the coordinates of the intersection points 32 and 33 also coordinates of several or many intermediate points within the contour line 9.

It is pointed out, that the Figures are of a mere schematic nature and only serve for illustrating. In practice the contour lines or the extent of the grating fields lie within the millimeter and centimeter range. The spacings between the grating lines lie in the micrometer range and therebelow, that is, when in the Figures only few grating lines are drawn, in practice this corresponds to up to several thousands of grating lines. The electron beam as a lithography instrument permits very fine resolutions, which reach the nanometer range. For this reason it is preferably used. In case gratings are to be written, which do not require such a high resolution, also other lithography instruments are possible as to form the grating lines 13 in a substrate. Possible methods are mechanical engraving with a precision milling apparatus or another form of material removal, e.g. with a focussed UV laser. In principle all instruments can be used, which permit a writing of lines, on the basis of the above-mentioned data records, each starting at a starting point and ending at an end point, in a sufficiently fine line thickness onto a suitable substrate. Such a series of material processing leaves characteristic marks in the substrate, due to which the person skilled in the art at least with the help of an electron microscope can recognize, which type of instrument was used for producing the lines in the substrate.

The invention claimed is:

1. Method for producing a grating image of a security element, which at least has one grating field separately perceptible with the naked eye, said method comprising the following steps:

defining a contour line of the at least one grating field, filling a contour determined by the contour line with a grating pattern, the grating pattern within the contour line being described by grating coordinates, supplying the grating coordinates to a writing apparatus, and producing the grating pattern in a substrate with the writing apparatus and with help of the grating coordinates, wherein the grating coordinates of grating lines are sequentially sorted according to their spatial disposition.

2. Method according to claim 1, wherein the grating pattern is formed by grating lines which are disposed side by side.

3. Method according to claim 1, wherein coordinates of a starting point of each of the grating lines are sorted side by side with respective coordinates of a starting point of a neighboring grating line and coordinates of an end point of each of the grating lines side by side with respective coordinates of an end point of a further neighboring grating line.

4. Method according to claim 3, wherein the respective starting points and end points of grating lines located side by side are connected to form a meandering processing path.

* * * * *